Dec. 18, 1962    H. V. KNAUF, JR., ET AL    3,068,825
ASSEMBLING DEVICE FOR ELECTRON TUBES
Original Filed May 26, 1958    2 Sheets-Sheet 1

INVENTORS
HARRY V. KNAUF, JR.
GEORGE M. ROSE, JR.
BY
L. A. Larsen
ATTORNEY

Dec. 18, 1962  H. V. KNAUF, JR., ET AL  3,068,825
ASSEMBLING DEVICE FOR ELECTRON TUBES
Original Filed May 26, 1958  2 Sheets-Sheet 2

TO VACUUM PUMPS

INVENTORS
HARRY V. KNAUF, JR.
GEORGE M. ROSE, JR.
BY
L. A. Larsen
ATTORNEY 3,068,825
Patented Dec. 18, 1962

3,068,825
ASSEMBLING DEVICE FOR ELECTRON TUBES
Harry V. Knauf, Jr., Mountainside, and George M. Rose, Jr., Mountain Lakes, N.J., assignors to Radio Corporation of America, a corporation of Delaware
Original application May 26, 1958, Ser. No. 737,785, now Patent No. 3,004,185, dated Oct. 10, 1961. Divided and this application Nov. 21, 1958, Ser. No. 775,451
3 Claims. (Cl. 113—99)

The present invention relates to a device or jig for facilitating the assembling of electron tube parts, and particularly to an improved device having a structure adapted to receive individual electron tube parts in an orientation desired in a completed tube and made of a material to permit fixing of the parts of each other while in the aforementioned orientation, by the application of suitable heat.

This is a division of copending application Serial No. 737,785, filed May 26, 1958, now issued as U.S. Patent 3,004,185.

One field in which the device of the invention finds particular utility is that involving the manufacture of receiving type tubes. Heretofore, such tube types have been made in accordance with a practice that has involved first the incorporation of the tube parts in sub-assemblies and later, joining the sub-assemblies to form a tube.

This complex procedure in tube manufacture is objectionable in that skilled labor is required and in that the several stages involved in making the sub-assemblies increase the probability of shrinkage, because of the necessary handling and transport.

But not only does the practice of making the sub-assemblies in tube fabrication involve appreciable shrinkage and require skilled labor, but it precludes a desired versatile tube design. The need for sub-assemblies renders it difficult if not impossible to produce a basic design for tubes of different electrode complements. Usually each cage is unique and differs in many respects from all other cages. Hence, common parts and common jigs cannot be used for several different tube types. This lack of flexibility in conventional receiving tube designs is a serious bar to economies in tube manufacture.

While the foregoing problems are associated with the fabrication of receiving type tubes, it is obvious that they may also characterize other tube types, especially where volume production is involved.

Accordingly, it is an object of the invention to provide an improved assembling device or jig for making an electron tube.

Another aim is to provide an improved jig for assembling and fixing individual parts constituting a tube, and which contributes to reduction in shrinkage in manufacture while permitting the utilization of relatively unskilled labor.

A further purpose is to provide an improved assembling device adapted to receive a plurality of individual parts in their final positions with respect to each other, thereby eliminating the need for sub-assemblies.

An electron tube adapted to be assembled with the aid of the jig of the invention may have a structure comprising a flat wafer or disc made, for example, of a ceramic material, and having openings therethrough defined by walls coated with a suitable metal. Wire lead-ins and supports extending through the aforementioned openings, are suitably bonded to the metal coating referred to, for providing a relatively rugged and hermetic seal therewith. The lead-ins and supports aforementioned extend into the envelope of the tube and are fixed as by brazing to tube parts. The tube parts comprise a plurality of concentric cylindrical electrode elements of progressively enlarged cross-section, each having affixed to one end thereof, and in coaxial relation thereto, a metal flange or collar. For reducing capacitance between the lead-ins, a relatively large spacing therebetween is insured by a relatively large transverse extent of the collars in relation to the electrode elements to which they are affixed. Furthermore, the collars are stepped both in regard to their transverse extents as well as in a direction along the axis of the wafer referred to, for a purpose that will become clear.

This array of the collars aforementioned permits the lead-ins and supports to be arrayed in concentric circles through the stem wafer, the number of circles being equal to the number of tube elements requiring connection to suitable power or voltage sources outside of the tube. In the case of a triode having an indirectly heated cathode, the number of such circles is four. This provides two lead-ins in the innermost circle for the cathode heater, one lead-in in the next adjacent circle for the cathode, and a lead-in in each of the two next adjacent circles for a grid and an anode.

In addition to the lead-ins referred to, for the cathode, grid and anode, additional wires serving exclusively as supports, may partly extend through openings in the stem wafer, for contributing to the support of each of a cathode sleeve, grid and anode. The additional wires in each circle are spaced 120° from each other and from the lead-in wire positioned in this circle. A pair of each of the support wires aforementioned extends inwardly of the tube for engagement with the collars for each of the cathode sleeve, grid and anode. In this way the lead-in for each of these electrode elements cooperates with two support wires to provide a tripod type of support for each electrode element.

This tripod type of support is advantageous in that the inner ends of the wires constituting each tripod system, terminates in and defines a plane normal to the electrode axes. This effectively restrains tilting of the electrodes so that the cathode and grid may be relatively closely spaced without danger of electrical shorts therebetween.

The cathode sleeve aforementioned serves to carry a later applied cathode member in the form of a metallic cup that bears an active emitting coating.

According to the invention, a novel jig or assembling device is provided on which the parts aforementioned are adapted to be assembled in substantially strain free relation and fixed without disturbing the strain free relation aforementioned. The jig has means for receiving successively, in vertical position, a tubular cathode sleeve, a cylindrical grid and a cylindrical anode in concentric and suitably spaced relation. Thereafter, the collars or flanges are loaded to engage and rest on the upper ends of the electrode elements when the same are in the aforementioned position. The cathode heater may be positioned in the cathode sleeve at any stage of the foregoing procedure after the cathode sleeve has been loaded. Thereafter, the wafer or disc is positioned on a portion of the jig which disposes the wafer above the electrodes and in coaxial relation therewith and with the heater legs extending partly through openings in the wafer. Then the wire lead-ins and supports are threaded through appropriate openings in the wafer to provide a tripod engagement with each of the collars and with the free ends of the heater legs.

The jig may be made of a suitable metal or ceramic material adapted to withstand elevated temperatures. This permits the jig with the parts loaded thereon as aforementioned, to be placed in an oven having a sufficiently high temperature for sealing the wire lead-ins and supports to the metalized coatings in the stem openings through which they extend, and for brazing end portions of the lead-ins to the collar supports. This serves to fix the parts referred to, thereby simultaneously providing a unitary structure comprising essentially a completed tube. It will be noted that no stresses are applied to the parts during the fixing operation, and accordingly, no strains are set up in the resultant tube structure.

To provide an emitting surface on the cathode sleeve, a metal cup carrying an emitting coating is later telescoped over the cathode sleeve after the fixed parts have been removed from the jig. A shell, such as of metal or ceramic, may then be telescoped over the tube structure aforementioned, with the rim of the shell slightly spaced from the periphery of the wafer. This periphery is provided with a metallic coating, so that on disposition of the tube structure and the shell in an evacuating oven such as a bell jar, evacuation of the bell jar will cause evacuation of the shell through the space between the shell and the wafer. Thereafter, suitable means may be used to heat the rim of the shell to seal it to the metallic coating on the periphery of the wafer and to sinter the cathode cup to the cathode sleeve. Here again, it will be noted, that no stresses are applied to the tube structure during the exhaust and sealing operations.

One important advantage accruing from the novel jig, according to the invention, is that the assembly may be effected with substantially equal facility no matter how small or large the parts are. Therefore, it is feasible, according to the invention, to make an electron tube of extremely small size.

The foregoing brief description of one way of practicing the invention is presented for illustrative purposes only.

Further features and objects of the invention will become apparent as the description continues.

Reference to the drawing for a more detailed consideration of aforementioned one way of carrying out the invention, will reveal that FIG. 1 is an exploded view of the parts constituting an electron tube and adapted to be assembled on the jig of the invention;

Figure 7:
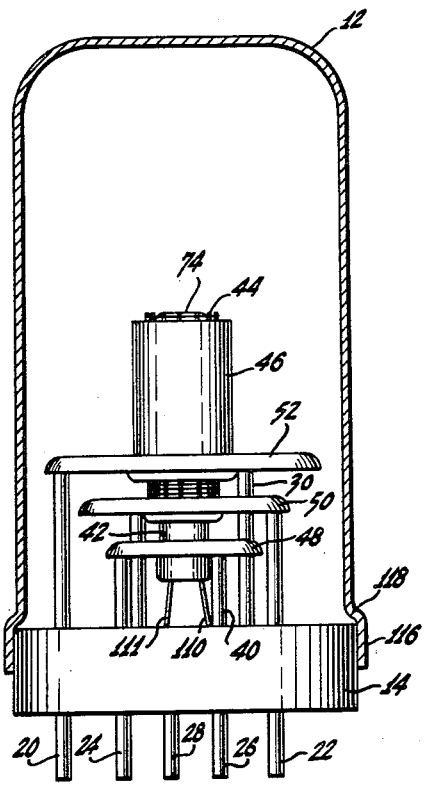
Figure 6:
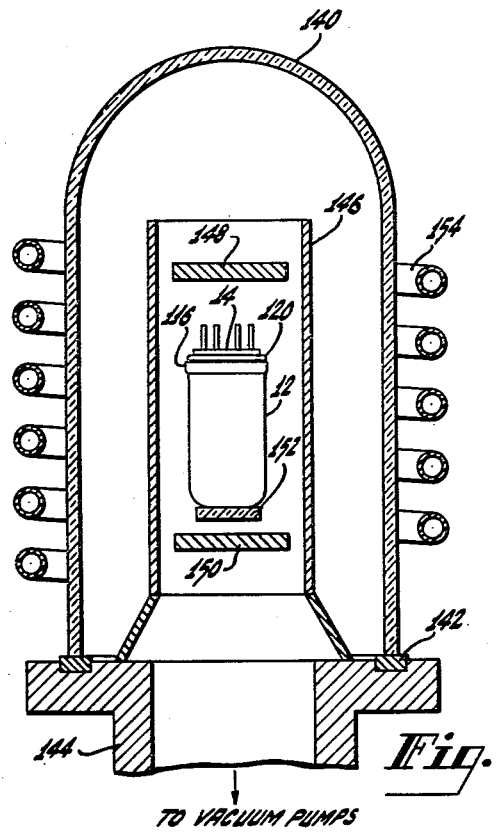

FIG. 6 shows a sectional elevation of a bell jar type oven adapted to receive the mount and bulb in telescoped relation, for de-gasing the tube components, breaking down the active cathode coating, exhausting the envelope formed by the telescoped shell and tube structure, and sealing the shell to the wafer of the aforementioned structure; and FIG. 7 shows a side elevation partly in section of a completed tube.

Figure 1:
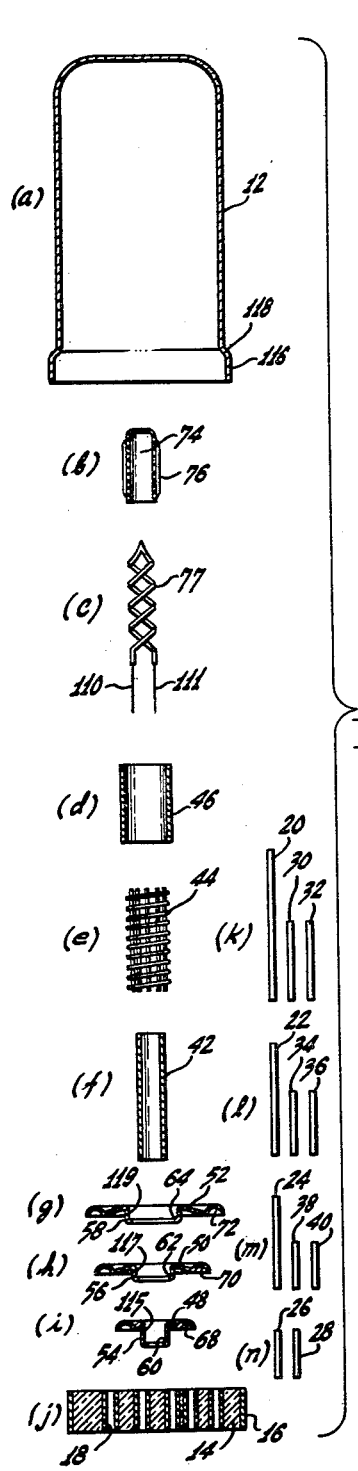

One way of practicing the invention, which is selected for illustrative purposes, comprises the utilization as work pieces, of the electron tube parts shown in FIG. 1. When these parts are assembled with the aid of the jig of the invention there results an electron tube depicted in FIG. 7.

A brief description of the foregoing parts and their functions will be of aid in the later consideration of the jig used in assembling the parts to form a tube structure. The parts referred to, as shown in FIG. 1, comprise a shell 12 which is shown as being made of metal, such as steel, but which may be made of other materials, such as ceramic. The header in the form of a circular wafer or disc 14 made of a ceramic, such as Forsterite, for example, is provided with a metallic coating 16 on its periphery and has a diameter for snugly entering the open end of shell 12. The metallic coating 16 may be molybdenum. The wafer 14 also is provided with a plurality of openings extending therethrough. The walls defining the openings are provided with a metallic coating 18, such as molybdenum, and are arrayed in a predetermined fashion to be described. A plurality of lead-in wires 20, 22, 24, 26, 28 and support wires 30, 32, 34, 36, 38, 40, made of a refractory metal, such as molybdenum, have a diameter for snugly, but freely, entering the openings in wafer 14. Electrode elements comprise a tubular cathode sleeve 42 which may be made of a metal, such as is commercially known as Nichrome, a tubular grid 44, and a tubular anode 46 made of a metal, such as nickel. The electrode elements referred to are adapted to be fixed to collars or flanges 48, 50, 52, respectively, made of steel, for example, and have diameters for snug entrance into the tubular portions 54, 56, 58 of the flanges referred to, and against the inwardly turned stops 60, 62, 64, thereof. The flanges 48, 50, 52 are adapted to engage wire lead-ins 20 to 28 and supports 30 to 40 at recessed annular portions thereof, provided with coatings 68, 70 and 72 of a suitable brazing material. The tubular cup or member 74 having an emitting coating 76 and closed at one end, has a diameter for snug telescoped receipt by the cathode sleeve 42, and in combination with the sleeve 42, forms the cathode element of the tube. A heater 77, which may be of the double helical type, is adapted to be positioned into the cathode element consisting of member 74 and sleeve 42, for heating the same to desired emitting temperature.

Figure 3:
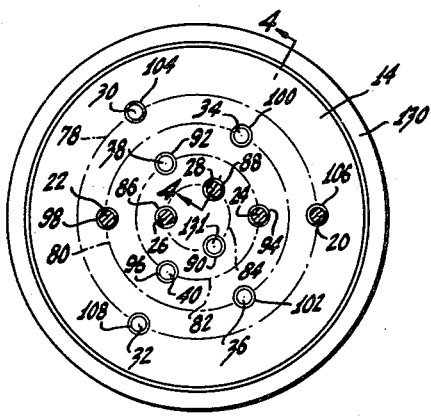
FIG. 3 is a view taken along the line 3—3 of FIG. 1.

As shown in FIG. 3, the openings through wafer 14 for accommodating a triode type tube, are arrayed in four concentric circles 78, 80, 82 and 84, shown in phantom. Three openings are disposed in equidistant relation in each of the circles. The openings in adjacent circles are angularly displaced 60° from each other to provide maximum spacing therebetween.

In conformity with this arrangement, the innermost circle 84 includes three openings 86, 88, 90 angularly spaced 120°. The next adjacent circle 82 includes three openings 92, 94, 96 angularly spaced, not only 120° from each other but also 60° from openings 86, 90. The third circle 80 includes openings 98, 100, 102 also angularly spaced 120° from each other and 60° from openings 92, 94, 96. Openings 104, 106, 108 in the outermost circle 78 are likewise mutually angularly spaced 120° and spaced from the openings 98, 100, 102 by 60°. Lead-in and support wires extending through the several openings referred to, are therefore adapted to provide a plurality of tripod supporting systems characterized by increased ruggedness, and reduced capacitance.

Flanges 48, 50 and 52, as aforementioned, are provided with metallic coatings, such as coatings 68, 70, 72, which may be copper or other suitable brazing material. The lead-in and support wires are likewise provided with metallic coatings, such as copper, for brazing purposes. These coatings in the current embodiment are applied by electroplating.

The metallic coating on the ceramic wafer can be applied by any of the well known metallizing processes. For example, the solution metallizing process bases on soluble salts of molybdenum may be utilized to apply a metallic coating on all exposed surfaces of the wafer. After reduction of the salt to molybdenum, a grinding process is employed to remove the metal coating from the flat surfaces of the wafer. After such grinding operation the wafer 14 has metal coatings 18, 16, only on desired portions thereof consisting of the walls defining the openings therethrough as aformentioned, and the periphery of the wafer.

Figure 2:
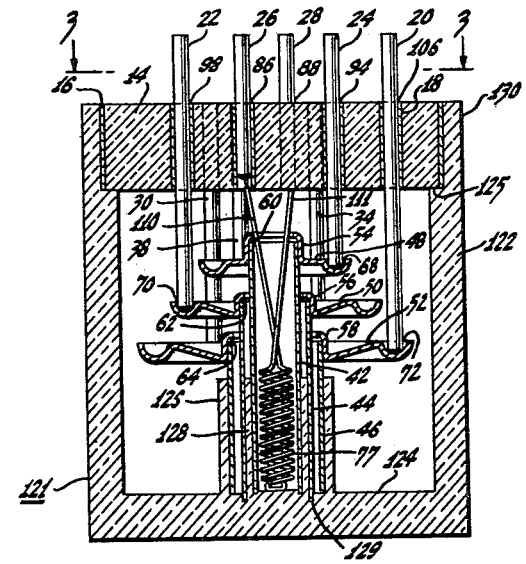
FIG. 2 shows a sectional elevation of a jig, according to the invention, with certain parts shown in FIG. 1, mounted thereon.

Only certain of the wire structures shown in FIG. 1, i.e., wires 20, 22, 24, 26 and 28, may be employed for lead-in purposes. These wires therefore have a sufficient length for engaging their associated elements within the completed tube, and for extending outwardly from the wafer 14 for service as contact prongs. Thus, as shown in FIG. 2, lead-in wires 20, 22, 24, 26 and 28 extend through wafer openings 106, 98, 94, 86 and 88, respectively. Lead-in wires 20, 22 and 24 engage collars 52, 50 and 48, respectively, connected to the three electrodes of the tube, and lead-in wires 26 and 28 extend partly through the wafer 14 for engaging the free ends of heater legs 110 and 111. The inner ends of the lead-in wires 26, 28 may have a metallic coating, such as copper, for fixing the heater legs thereto.

Figure 4:
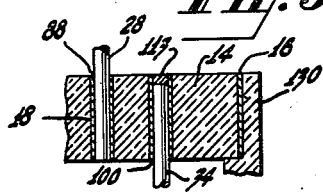
FIG. 4 is a view taken along the line 4—4 of FIG. 3.

The other wire structures shown in FIG. 1, i.e., wires 30, 32, 34, 36, 38 and 40, have a length for engaging the collars 48, 50 and 52, and for only partly extending through the wafer 14, as shown in FIG. 4 in relation to one of the support wires, i.e., wire 34. The resultant cavities defined by the openings 92, 96, 100, 102, 104 and 108 (FIG. 3) one of which cavities is shown in FIG. 4, may be filled with a body of metal 113, such as copper. The opening 90 of the innermost circle, into which no lead-in wire extends, may also be filled with a stud or body of metal, such as copper, for hermetically closing this opening. While the opening 90 has no utility, once a selection has been made, of the appropriate openings in the innermost circle for receipt of heater legs 110 and 111, it possesses advantage in facilitating orientation of the wafer in relation to the heater legs referred to, which is of particular value in mechanized assembling techniques. The lead-in and support wires in an alternative arrangement, are of the same length and cut to desired length after the tube has been completed.

As has been previously described, the collar portions 54, 56, 58 of the flanges aforementioned, have been provided with metallic coatings including internal metallic coatings 115, 117 and 119, (FIG. 1) for brazing the flanges referred to, to the cathode sleeve 42, grid 44 and anode 46 in a manner to be described.

The metal shell 12 (FIGS. 1 and 7) is provided with an outwardly stepped portion 116, resulting in the formation of an annular stop 118 against which the wafer 14 may abut to determine the magnitude of the entrance of the wafer into the bulb. For hermetically joining shell 12 to the metallic coating on the periphery of the wafer, a ring of brazing material 120 (FIG. 6) is utilized.

The foregoing structural and the functional description of the parts constituting an electron tube will facilitate an appreciation of the following description of an assembling device or jig for assembling and processing certain of the parts aforementioned, to form an improved electron tube.

As shown in FIG. 2, the jig 121, according to the invention, may be made of a metal, such as Nichrome, or of a ceramic, such as Zircon or Alumina. As shown in FIGS. 2 and 3, the jig includes tubular means in the form of a cylindrical outer wall 122 closed at one end by a transverse base or end wall bottom portion 124. To facilitate heat transfer, portions of the outer wall may be cut away. The outer wall 122 is relatively thin adjacent to its free end to provide an annular shoulder 125. By virtue of the shoulder 125 a planar support surface and a cylindrical jigging surface are provided for a purpose hereinafter described. Projecting upwardly from the bottom portion 124 are two concentric and relatively thin, hollow cylinders or tubular elements 126, 128 spaced for receipt therebetween of the cylindrical grid 44 and the cylindrical anode 46, in spaced relation, as shown in FIG. 2. The outer cylinder 126 has a length slightly less than that of the cylindrical anode 46, and an inside diameter for snugly receiving the anode. The inner cylinder 128 has a length substantially equal to the length of the outer cylinder 126 and has an outside diameter for snugly receiving the grid and an inner diameter for snugly receiving therein the cylindrical cathode sleeve 42. The bottom portion 124 of jig has an annular groove 129 adjacent to the outer surface of inner cylinder 128, to allow the grid 44 to extend downwardly, as shown in FIG. 2, farther than the anode 46 and cathode sleeve 42, for a purpose that will become apparent. The reduced thickness wall portion 130 of the outer wall 122 of the jig has an inner cylindrical jigging surface having a diameter for snugly receiving the wafer 14.

In assembling parts on the jig aforedescribed, the anode 46, grid 44 and cathode sleeve 42 are mounted in telescoped relation with respect to the jig cylinders 126 and 128 as shown in FIG. 2. No particular order in mounting these elements on the jig need be observed, since none of these parts, when mounted, obstructs the mounting of the other two parts.

Thereafter, the flanges 48, 50 and 52 are mounted on the three previously mounted parts as aforementioned, and held in the desired orientation by an abutment of the free ends of these parts with stops 60, 62 and 64 on the flange structures. Due to the sizes of the flanges referred to, a predetermined mounting order thereof is required. Thus, flange 52 must be mounted first on anode 46. Then flange 50 must be mounted on grid 44, and thereafter the flange 48 may be mounted on cathode sleeve 42. This order is required since the lateral extents of the flanges preclude a mounting of flange 50 subsequent to flange 48, or a mounting of flange 52 after either flanges 48 or 50 have been mounted. When the flanges are mounted as indicated, the annular troughs thereof having metallic coatings 68, 70 and 72, face upwardly.

The heater 77 may then be extended into the cathode support 42 and permitted to abut against the lower wall portion 124 of the jig. No critical order need be followed in mounting the heater 77 other than that its mounting should preferably be preceded by the mounting of cathode sleeve 42 to avoid entanglement of the sleeve with heater legs 110, 111.

After the tube elements have been loaded, as aforementioned, the wafer 14 is telescoped into the end portion of the jig defined by the relatively thin wall portion 130, until the wafer comes to rest on the planar surface provided by the annular shoulder 125, as shown in FIG. 2. During the mounting of wafer 14 on the jig, the upwardly extending heater legs are inserted into two openings in the inner circle of openings through the wafer. For example, the heater legs may be extended partly into openings 86, 88, shown in FIG. 3.

The final elements to be loaded on jig 121 are the lead-in and support wires shown in FIG. 1. For convenience, the wires intended for service as supports are loaded prior to the loading of the wires intended for lead-in purposes. This permits the support wires to be loaded with freedom from obstruction by upwardly extending lead-in wires. Since the support wires do not extend upwardly from the wafer when loaded, the loading of the lead-in wires is also free from obstruction and the lead-in wires accordingly, may be suitable angularly and rectilinearly spaced to insure reduced capacitance effects therebetween. Due to a predetermined structural correlation between the stem 14 and the flanges 48, 50 and 52, the three outermost circular arrays of openings through the stem are in axial register with the annular flange troughs having the metallic coatings 68, 70 and 72. As a consequence, any random angular orientation of the wafer 14 with respect to the flanges aforementioned, while preserving a coaxial relation therebetween, disposes a predetermined circular opening array in the wafer, in axial register with a portion of the annular trough in a predetermined flange. This freedom from dependence on a particular angular orientation of the wafer 14 and the flanges 48, 50 and 52, contributes to facility in assembly, whether of the manual or mechanized kind.

The aforementioned loading of the lead-in and support wires causes them to engage appropriate flanges 48, 50 and 52 and heater legs 110, 111. For example, support wires 30, 32 (FIG. 1) engage flange 52, the support wires 34, 36 are positioned to contact flange 50, and support wires 38, 40 are mounted to rest on flange 48. It will be noted that the wires comprising group 30, 32 are longer than the wires comprising group 34, 36 and that the latter wires are longer than the wires comprising group 38, 40. This difference in length in the support wires is due to the axial spacing between the flanges 48, 50, 52. Likewise, lead-in wires 20, 22 and 24 engage flanges 52, 50 and 48, respectively. Lead-ins 26, 28 engage heater legs 111 and 110, respectively.

Finally balls of copper (not shown) may be placed in the cavities representing portions of openings 92, 96, 100, 102, 104 and 108 not occupied by wire supports, to form a copper mass 113 (FIG. 4) for filling the cavities and contributing to a hermetic sealing of the cavities. A stud 131 made of or coated with copper may be snugly inserted in vacant opening 90 (FIG. 3) and may have a length substantially equal to the thickness of wafer 14.

The resultant loose assembly of parts is substantially strain-free and each of the elements mounted engages another through a metallic coating adapted to bond the elements together in a fixed structure.

Thereafter, the jig 121, and the parts assembled thereon as indicated in FIG. 2, are heated in a reducing atmosphere, such as hydrogen. The heating of the jig and parts is first effected in a hydrogen oven having a temperature of about 1130° C. During the first minute of such heating, in one example, the parts were raised to the temperature of the oven. After acquiring this temperature, the parts are permitted to remain in the oven for several minutes. Thereafter, the parts and the jig are cooled to a temperature of about 250° C. This cooling step requires about two minutes. The parts mounted on the jig 121 are now fixed in brazed engagement by the several metallic coatings aforementioned. On removal from the oven the jig and the parts thereon are allowed to cool naturally to room temperature. It will be noted that no strains are applied to the parts during the aforementioned second step.

Figure 5:
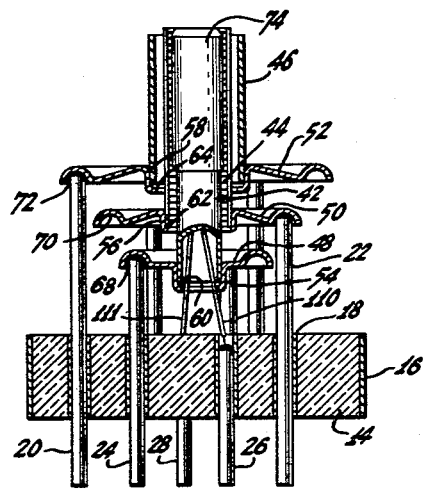
FIG. 5 is an elevational view partly in section of a tube structure assembled as in FIG. 2 and after fixing of the parts and the addition of an active cathode surface, to provide a self-supporting structure.

The resultant brazed structure is then removed from jig 121 and cathode member 74 is telescoped snugly over the free end of cathode sleeve 42, as shown in FIG. 5. The inner surface of the member 74 and the outer surface of cathode sleeve 42 are sufficiently rough to provide a plurality of point engagements which are adapted to be joined together as by sintering.

Further processing of the brazed structure and other parts involves use of a heating and exhaust system shown in FIG. 6. This system includes an evacuated chamber, such as a bell jar 140 made of a ceramic material or a high temperature glass sealed to a vacuum source (not shown) by engaging a heat resistant gasket 142 mounted on flanged metallic conduit 144 communicating with the vacuum source. Within the bell jar 140 is disposed a metallic tubular muffle 146 having heat baffles 148 and 150 adjacent to its ends. A support 152 within the muffle is adapted to support a tube assembly comprising bulb 12 and wafer 14 which includes the mount structure shown in FIG. 5 between the heat baffles 148 and 150. A high frequency induction coil 154, connected to a suitable adjustable power source, not shown, is adapted to heat the muffle 146. The muffle in turn radiates heat to the tube assembly referred to.

During the aforementioned further processing, the shell 12 is telescoped over the wafer 14 until the shoulder or stop 118 on the shell rests on the wafer, a ring 120 of brazing material having been positioned to engage the periphery of the wafer and to rest on the rim edge of the shell, as shown in FIG. 6. The resultant tube structure is then placed on support 152 and the coil 154 is electrically energized to heat muffle 146 to a temperature sufficiently high to cause the heat radiation therefrom to the tube structure to raise the parts thereof to a temperature of about 800° C. The structure is permitted to remain at this temperature for several minutes for de-gassing the metal components of the assembly. During this heating step, the vacuum source referred to continues to remove gas from the bell jar and from the interior of the tube envelope defined by shell 12 and wafer 14. Removal of gasses from the envelope referred to occurs through an annular space between the loosely mounted shell and the initially formed tube structure. The temperature aforementioned is insufficient to melt the brazing ring 120 or to completely sinter the cathode member 74 to its sleeve 42. Tests have revealed that a period of several minutes for out-gassing and exhaust produce satisfactory tubes. Longer periods up to 60 minutes, of course, provide increased assurance that the outgassing and evacuation have proceeded as far as possible.

Thereafter and while the bell jar 140 is kept evacuated, the energy to the coil 154 is increased, to cause the tube parts to be raised to temperature of about 950° C. At this temperature the member 74 becomes further sintered to its support sleeve 42, and the brazing ring 120 melts to braze the shell 12 to wafer 14 in a vacuum tight seal.

During the out-gassing operation electric power may be applied to the heater 77 for supplementing the heat applied by muffle 146, for improved out-gassing. However, tests have revealed that satisfactory tubes are obtainable without energizing the heater during the out-gassing step.

It will be noted that the out-gassing and sealing temperature, above referred to, are appreciably below the temperature of 1130° C. to which the initial tube structure was subjected, thereby precluding a re-melting of the copper brazing material. The lower temperature, i.e., 950° C., does not adversely affect the conditions previously established. To respond in brazing to this lower temperature, the brazing ring can be made of a suitable alloy such as one known as NIORO solder which includes nickel and gold.

A tube produced with the aid of the jig of the invention is shown in FIG. 7. It includes a tube structure wherein the cathode member 74, grid 44 and anode 46 are ruggedly supported on flanges 48, 50 and 52, respectively. The flanges referred to have an appreciable lateral extent and each is supported adjacent its periphery by a tripod array of lead-in and support wires firmly fixed to wafer 14. This effectively restrains relative movements between the electrodes, in both angular and rectilinear directions, and permits extremely close spacing between the cathode and grid without danger of shorts therebetween.

Use of the advantageous jig of the invention, as pointed out in the foregoing, makes it feasible to fabricate the tube to very small dimensions.

In one example, the overall diameter of the tube was three-eights of an inch and the length of the tube was approximately one-half inch. While the shell 12 shown in FIG. 7 is longer than necessary to provide space accommodation for the electrodes therein, its extra length results in an increased shell area desirable for heat dissipation. Shorter shells, of course, may be used and a desired heat dissipation therefrom may be effected by supplemental heat exchange means, not shown. This is particularly feasible since the shell 12 is free from connection to any electrode element.

While the relatively small size referred to above is presented as an example, it is not to be inferred that this constitutes a limit to which miniaturization is feasible, according to the invention. While the advantage of lending itself to small tube size has been pointed out, it should be noted that the jig of the invention has utility in tubes of any size, including relatively large power tubes.

It will be appreciated from the foregoing that the jig of the invention permits a progressive type of assembly operation to be practiced in which the final tube structure is made by successively adding the parts individually for reduced shrinkage. Such progressive type of assembly is more advantageous than a type requiring the fabrication of sub-assemblies, both in respect of the simplicity of the assembling operation as well as the ease with which it lends itself to mechanization.

What is claimed is:

1. A jig adapted to receive a plurality of individual parts in desired space relation, said jig comprising three concentric cylinders extending in a given direction from a common base, the two innermost of said cylinders having a substantially equal length and being sufficiently radially spaced to provide an annular space therebetween adapted to receive two tubular electrodes in radially spaced relation, the outermost of said cylinders extending a greater distance from said base than said two innermost cylinders and having an annular shoulder adapted to receive a wafer in coaxial relation to said two cylinders and in axially spaced relation with respect to said two electrodes when received by said two cylinders.

2. A jig adapted to receive loosely a plurality of individual tubular electron tube mount parts in contacting relation, said jig comprising: an outer cup shaped element having an end wall and a tubular wall extending therefrom which has a shoulder adjacent to its free end, and two concentric tubular elements radially spaced from each other and extending from the end wall of said cup shaped element within said cup in coaxial relation with said tubular wall.

3. A brazing jig for receiving in predetermined spaced relationship a plurality of tubular electron tube electrodes and a circular header member; said jig comprising a base wall; a plurality of different diameter, concentric tubular elements extending from one side of said base wall for concentrically receiving said plurality of electrodes; and means surrounding said tubular elements and extending from said one side of said base wall, said means including a support surface spaced from base wall for supporting said header member in axially spaced relationship with said electrodes and a cylindrical jigging surface adjacent to said support surface for laterally positioning said header member.

References Cited in the file of this patent
UNITED STATES PATENTS

| | | |
|---|---|---|
| 2,186,641 | Jones | Jan. 9, 1940 |
| 2,433,339 | Brown | Dec. 30, 1947 |
| 2,445,766 | Derby et al. | July 27, 1948 |
| 2,599,394 | Kohl | June 3, 1952 |
| 2,621,303 | Law | Dec. 9, 1952 |
| 2,706,232 | Pilas | Apr. 12, 1955 |